United States Patent
Ichino et al.

(10) Patent No.: US 9,573,176 B2
(45) Date of Patent: Feb. 21, 2017

(54) OUTER-LAYER MATERIAL FOR HOT-ROLLING ROLL, AND HOT-ROLLING COMPOSITE ROLL

(71) Applicant: JFE STEEL CORPORATION, Tokyo (JP)

(72) Inventors: Kenji Ichino, Chita (JP); Tetsuo Mochida, Chita (JP); Hiromitsu Shibata, Chita (JP)

(73) Assignee: JFE STEEL CORPORATION, Tokyo (JP)

( * ) Notice: Subject to any disclaimer, the term of this patent is extended or adjusted under 35 U.S.C. 154(b) by 47 days.

(21) Appl. No.: 14/427,759

(22) PCT Filed: Sep. 6, 2013

(86) PCT No.: PCT/JP2013/005301
§ 371 (c)(1),
(2) Date: Mar. 12, 2015

(87) PCT Pub. No.: WO2014/041778
PCT Pub. Date: Mar. 20, 2014

(65) Prior Publication Data
US 2015/0239026 A1    Aug. 27, 2015

(30) Foreign Application Priority Data
Sep. 13, 2012 (JP) ................. 2012-201514

(51) Int. Cl.
*B21B 27/00* (2006.01)
*B21B 27/03* (2006.01)
(Continued)

(52) U.S. Cl.
CPC ............. *B21B 27/03* (2013.01); *B21B 27/032* (2013.01); *B22D 11/1287* (2013.01);
(Continued)

(58) Field of Classification Search
CPC ...... B21B 27/03; B21B 27/032; B32B 15/011; B22D 11/1287; C22C 38/04; C22C 38/06; C22C 38/54; C22C 38/50; C22C 38/46; C22C 38/002; C22C 38/48; C22C 38/02; C22C 38/56; C22C 38/44; C22C 38/52; C22C 38/005; C22C 38/34; C22C 37/08; C22C 37/10; C21D 9/38
See application file for complete search history.

(56) References Cited

FOREIGN PATENT DOCUMENTS

| CN | 101530863 A | 9/2009 |
|---|---|---|
| CN | 101831590 A | 9/2010 |

(Continued)

OTHER PUBLICATIONS

Feb. 3, 2016 Office Action issued in Chinese Patent Application No. 201380047881.6.
(Continued)

*Primary Examiner* — Jason L Vaughan
(74) *Attorney, Agent, or Firm* — Oliff PLC

(57) ABSTRACT

A surface layer material of a hot rolling mill roll is provided. The surface layer has a chemical composition containing, by mass %, C: 2.4% or more and 3.5% or less, Si: 1.2% or more and 2.4% or less, Mn: 0.2% or more and 2.0% or less, Cr: 0.8% or more and 2.1% or less, Mo: 0.3% or more and 1.1% or less, Ni: 3.0% or more and 6.0% or less, V: 1.0% or more and 2.2% or less, Nb: 0.1% or more and 0.5% or less, REM: 0.0005%) or more and 0.1% or less, Al: 0.003% or more and 0.05% or less, and the balance being Fe and inevitable impurities. The contents of C, Cr, V, Nb, REM, and Al satisfy the relationships Cr+0.2≤C−(0.24×V+0.13×Nb)≤3.0 and 0.01≤REM/Al≤3.2.

16 Claims, 2 Drawing Sheets

(51) Int. Cl.
*C22C 37/08* (2006.01)
*C22C 37/10* (2006.01)
*B22D 11/128* (2006.01)
*C22C 38/00* (2006.01)
*C22C 38/02* (2006.01)
*C22C 38/04* (2006.01)
*C22C 38/06* (2006.01)
*C22C 38/34* (2006.01)
*C22C 38/44* (2006.01)
*C22C 38/46* (2006.01)
*C22C 38/48* (2006.01)
*C22C 38/50* (2006.01)
*C22C 38/52* (2006.01)
*C22C 38/54* (2006.01)
*C22C 38/56* (2006.01)
*B32B 15/01* (2006.01)
*C21D 9/38* (2006.01)

(52) U.S. Cl.
CPC ............ *B32B 15/011* (2013.01); *C22C 37/08* (2013.01); *C22C 37/10* (2013.01); *C22C 38/002* (2013.01); *C22C 38/005* (2013.01); *C22C 38/02* (2013.01); *C22C 38/04* (2013.01); *C22C 38/06* (2013.01); *C22C 38/34* (2013.01); *C22C 38/44* (2013.01); *C22C 38/46* (2013.01); *C22C 38/48* (2013.01); *C22C 38/50* (2013.01); *C22C 38/52* (2013.01); *C22C 38/54* (2013.01); *C22C 38/56* (2013.01); *C21D 9/38* (2013.01)

(56) References Cited

FOREIGN PATENT DOCUMENTS

| | | |
|---|---|---|
| JP | H01-287248 A | 11/1989 |
| JP | H06-335712 A | 12/1994 |
| JP | H11-229072 A | 8/1999 |
| JP | 2001-181780 A | 7/2001 |
| JP | 2001-200335 A | 7/2001 |
| JP | 2001-279367 A | 10/2001 |
| JP | 2001-321807 A | 11/2001 |
| JP | 2002-331344 A | 11/2002 |
| JP | 2003-073767 A | 3/2003 |
| JP | 2003-342669 A | 12/2003 |
| JP | 2004-068142 A | 3/2004 |
| JP | 2004-162104 A | 6/2004 |
| JP | 2004-323961 A | 11/2004 |
| JP | 2005-068462 A | 3/2005 |
| JP | 2005-290533 A | 10/2005 |
| JP | 2008-050681 A | 3/2008 |

OTHER PUBLICATIONS

Dec. 3, 2013 Search Report issued in International Application No. PCT/JP2013/005301.

Apr. 8, 2016 Extended European Search Report issued in European Application No. 13837702.3.

OUTER-LAYER MATERIAL FOR HOT-ROLLING ROLL, AND HOT-ROLLING COMPOSITE ROLL

TECHNICAL FIELD

The embodiments of the present disclosure relate to a hot rolling mill composite roll, and in particular to the outer or surface layer material for a hot rolling mill roll and a hot rolling mill composite roll that is excellent in terms of wear resistance, heat shock resistance, and surface deterioration resistance which can be suitably used for a hot rolling finishing mill for a steel sheet.

BACKGROUND ART

Recently, since outstanding progress has been made in hot rolling techniques for manufacturing steel sheets and steel pipes, there has been a strong demand for increasing the properties of a hot rolling mill roll, in particular, for increasing wear resistance. In order to meet such a demand for increasing wear resistance, a high-performance roll (hereinafter, also called a high-speed steel roll), which has a surface layer having a chemical composition similar to that of high-speed tool steel and a microstructure including a hard carbide precipitated in order to significantly increase wear resistance, has been developed and put into practical use.

On the other hand, in the final finishing rolling stand for a steel sheet, cobble tends to occur on a rolled material and the surface skin pattern of rolls tends to be transferred to a steel sheet. Therefore, a nickel grain cast iron roll, which has high heat shock resistance as a result of containing graphite and has smooth surface skin, has been installed in order to perform hot rolling. However, in the case of a conventional nickel grain cast iron roll, there is a problem in that roll life is short due to poor wear resistance.

On the other hand, in the case of a high-speed steel roll having high wear resistance, there is a problem from the viewpoint of accident resistance, because, for example, a large heat shock crack occurs due to the occurrence of cobble or sticking. Therefore, in a stand in the latter stage of final finishing hot rolling of a steel sheet in which cobble tends to occur frequently, it is difficult to stably use a high-speed steel roll, and therefore a lot of nickel grain cast iron rolls have been used.

In order to solve such problems, for example, Patent Literature 1 proposes a hot rolling mill roll, in which wear resistance is increased by adding 1.0 to 5.0 wt. % of V to nickel grain cast iron. In addition, Patent Literature 2 proposes a hot rolling mill roll, in which wear resistance is increased by adding 2.0 to 8.0 wt. % of V to nickel grain cast iron and by forming, in terms of area ratio, 0.2% to 10% of MC type carbides in addition to 0.5% to 5% of graphite.

In addition, Patent Literature 3 proposes a surface layer material of a rolling mill roll, in which wear resistance and surface deterioration resistance are combined by decreasing the grain diameter of crystallized graphite in high-speed cast iron having a microstructure containing high-hardness compound carbides and graphite. Moreover, Patent Literature 4 proposes a wear-resistant hot rolling mill roll, in which occurrence of surface deterioration is suppressed by limiting the total content of Cr, V, and Nb to 3 wt. % or less and by forming, in terms of area ratio, 2% or more of crystallized graphite.

In addition, Patent Literature 5, Patent Literature 6, and Patent Literature 7 propose that wear resistance, sticking resistance, surface deterioration resistance, and heat shock resistance are increased by improving the form of MC type carbides through the addition of a combination of V and Nb and by controlling Cr content and effective C content. Moreover, Patent Literature 8 proposes the surface layer material of a hot rolling mill roll, in which heat shock resistance is notably improved by controlling a graphite structure in addition to the limitation on the chemical composition described above.

CITATION LIST

Patent Literature

PTL 1: Japanese Unexamined Patent Application Publication No. 1-287248
PTL 2: Japanese Unexamined Patent Application Publication No. 6-335712
PTL 3: Japanese Unexamined Patent Application Publication No. 11-229072
PTL 4: Japanese Unexamined Patent Application Publication No. 2001-181780
PTL 5: Japanese Unexamined Patent Application Publication No. 2003-73767
PTL 6: Japanese Unexamined Patent Application Publication No. 2003-342669
PTL 7: Japanese Unexamined Patent Application Publication No. 2004-162104
PTL 8: Japanese Unexamined Patent Application Publication No. 2004-323961

SUMMARY

Technical Problem

Nowadays, however, from viewpoint of an improvement in the quality of rolled products and efficient production, rolling speed is increased, the amount of continuously rolled materials is increased, and accordingly the usage environment of a hot rolling mill roll is becoming more and more severe. Furthermore, although demand for the surface quality of rolled products is becoming stronger, it is difficult to meet the requirements for wear resistance, heat shock resistance, and surface deterioration resistance at the same time by using the conventional techniques described above.

The embodiments of the present disclosure advantageously solve the problems with the conventional techniques described above, to propose the surface layer material of a hot rolling mill roll and a hot rolling mill composite roll having high wear resistance, heat shock resistance, and surface deterioration resistance at the same time.

Solution to Problem

The present inventors, in order to achieve the object described above, diligently conducted investigations regarding various factors having influences on the wear resistance, heat shock resistance, and surface deterioration resistance of a hot rolling mill roll.

As a result, the present inventors found an important phenomenon in which, in the case where a combination of REM and Al is added to nickel grain cast iron containing Cr, V, and Nb, wear resistance, heat shock resistance, and surface deterioration resistance vary depending on the ratio between the contents of these chemical elements and, in particular, the influence on heat shock resistance is large.

The results of a heat shock test are illustrated in FIG. 1. Using a plate-shaped test piece having a thickness of 25 mm which had been cut out of one of the ring shaped test materials which had been smelted with various contents of REM and Al, the heat shock test was performed using a disc-shaped opposite material (composed of S45C and having a diameter of 190 mmϕ) in a testing machine configured as illustrated in FIG. 3. The plate-shaped test piece having a thickness of 25 mm was rapidly heated by pressing the disc-shaped opposite material (composed of S45C and having a diameter of 190 mmϕ) which was rotating at 150 rpm while being heated at 830° C. using a high-frequency heating coil to the plate-shaped test piece with a load of 100 kgf for a duration of 10 seconds, and then the plate-shaped test piece was cooled with water at the same time as unloading in order to apply heat shock to the test piece. After the test had been performed, by performing a penetrant inspection, by cutting the test piece at the three portions having a large amount of stains of a developing liquid, and by observing the cross sections in order to determine the maximum depth of the cracks, the maximum depth was defined as a crack depth.

As illustrated in FIG. 1, it was found that a heat shock crack depth is large in the case where the mass ratio of REM and Al REM/Al is less than 0.01, that a heat shock crack depth is small and is 2.5 mm or less in the case where REM/Al is 0.01 or more and 3.2 or less, and that a heat shock crack depth increases in the case where REM/Al is more than 3.2.

Moreover, it was found that, in the case where effective C content (=C−(0.24×V+0.13×Nb)), that is, the residual C content after C has been consumed in combination with V and Nb, is not equal to or more than (Cr+0.2)%, there is a decrease in heat shock resistance (heat shock crack depth increases) due to an insufficient amount of graphite formed. On the other hand, it was found that, in the case where the effective C content is more than 3.0%, there is a significant decrease in wear resistance due to an excessive amount of graphite.

Embodiments of the present disclosure include the following:

[1] A surface layer material of a hot rolling mill roll which is used for a surface layer of a hot rolling mill composite roll, the material having a chemical composition containing, by mass %, C: 2.4% or more and 3.5% or less, Si: 1.2% or more and 2.4% or less, Mn: 0.2% or more and 2.0% or less, Cr: 0.8% or more and 2.1% or less, Mo: 0.3% or more and 1.1% or less, Ni: 3.0% or more and 6.0% or less, V: 1.0% or more and 2.2% or less, Nb: 0.1% or more and 0.5% or less, REM: 0.0005% or more and 0.1% or less, Al: 0.003% or more and 0.05% or less, and the balance being Fe and inevitable impurities, in which the contents of C, Cr, V, Nb, REM, and Al satisfy relational expressions (1) and (2) below.

$$Cr+0.2 \leq C-(0.24 \times V+0.13 \times Nb) \leq 3.0 \quad (1),$$

$$0.01 \leq REM/Al \leq 3.2 \quad (2),$$

where C, Cr, V, Nb, REM, and Al respectively represent the contents (mass %) of corresponding chemical elements.

[2] The surface layer material of a hot rolling mill roll according to item [1], in which the material has the chemical composition further containing, by mass %, B: 0.001% or more and 0.05% or less.

[3] The surface layer material of a hot rolling mill roll according to item [1] or [2], in which the material has the chemical composition further containing, by mass %, one or two selected from Ca: 0.04% or less and Ti: 0.03% or less.

[4] The surface layer material of a hot rolling mill roll according to any one of items [1] to [3], in which the material has the chemical composition further containing, by mass %, one or two selected from Co: 2.0% or less and W: 2.0% or less.

[5] A hot rolling mill composite roll with excellent wear resistance, heat shock resistance, and surface deterioration resistance consisting of an inner layer and a surface layer which are welded and integrated, the surface layer having a chemical composition containing, by mass %, C: 2.4% or more and 3.5% or less, Si: 1.2% or more and 2.4% or less, Mn: 0.2% or more and 2.0% or less, Cr: 0.8% or more and 2.1% or less, Mo: 0.3% or more and 1.1% or less, Ni: 3.0% or more and 6.0% or less, V: 1.0% or more and 2.2% or less, Nb: 0.1% or more and 0.5% or less, REM: 0.0005% or more and 0.1% or less, Al: 0.003% or more and 0.05% or less, and the balance being Fe and inevitable impurities, in which the contents of C, Cr, V, Nb, REM, and Al satisfy relational expressions (1) and (2) below.

$$Cr+0.2 \leq C-(0.24 \times V+0.13 \times Nb) \leq 3.0 \quad (1),$$

$$0.01 \leq REM/Al \leq 3.2 \quad (2),$$

where C, Cr, V, Nb, REM, and Al respectively represent the contents (mass %) of corresponding chemical elements.

[6] The hot rolling mill composite roll according to item [5], in which the surface layer has the chemical composition further containing, by mass %, B: 0.001% or more and 0.05% or less.

[7] The hot rolling mill composite roll according to item [5] or [6], in which the surface layer has the chemical composition further containing, by mass %, one or two selected from Ca: 0.04% or less and Ti: 0.03% or less.

[8] The hot rolling mill composite roll according to any one of items [5] to [7], in which the surface layer has the chemical composition further containing, by mass %, one or two selected from Co: 2.0% or less and W: 2.0% or less.

Advantageous Effects

According to embodiments, a composite roll having excellent wear resistance, heat shock resistance, and surface deterioration resistance at the same time can be manufactured at low cost as a roll for the latter-stage rolling stand of hot rolling of a steel sheet, which results in a significant effect in industry. In addition, the composite roll according to embodiments can be stably used as a roll for the latter-stage rolling stand in which cobble frequently occurs in hot rolling of a steel sheet. In addition, the composite roll according to embodiments can also be used as a roll for rolling shaped steel and a steel pipe for which excellent wear resistance and surface deterioration resistance are required.

DESCRIPTION OF EMBODIMENTS

Figure 1:
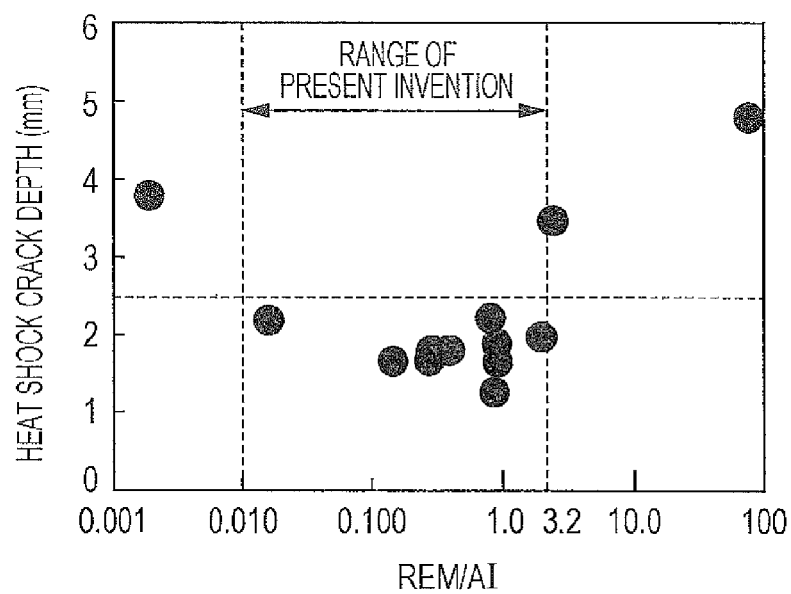
FIG. 1 is a diagram illustrating the relationship between a heat shock crack depth and REM/Al.

First, the reason for the limitations on the chemical composition of the surface layer (surface layer material) of the hot rolling mill composite roll according to embodiments of the present disclosure will be described. Here, mass % used when describing a chemical composition is simply expressed by % in the present description.

C: 2.4% or More and 3.4% or Less

Since C is a chemical element which is indispensable for forming hard carbides in combination with V, Nb, Cr, and Mo in order to increase the wear resistance of a roll and which is required for achieving sufficient heat shock resistance by forming crystallized graphite, it is necessary that the C content be 2.4% or more in certain embodiments. On the other hand, in the case where the C content is more than 3.4%, there is a decrease in heat shock resistance due to a large amount of eutectic carbides being formed and there is a decrease in surface deterioration resistance due to an increase in the grain diameter of graphite. Therefore, the C content is limited to 2.4% or more and 3.4% or less, preferably 2.8% or more and 3.3% or less.

Si: 1.2% or More and 2.4% or Less

Since Si is a chemical element which facilitates the crystallization of graphite by increasing the activity of C, Si is effective for increasing heat shock resistance. In order to realize such an effect, it is necessary that the Si content be 1.2% or more. On the other hand, in the case where the Si content is more than 2.4%, there is a significant decrease in the wear resistance and the surface deterioration resistance of a roll. Therefore, the Si content is limited to 1.2% or more and 2.4% or less.

Mn: 0.2% or More and 2.0% or Less

Mn is effective for rendering S, which decreases wear resistance, harmless and stable by fixing S in steel in the form of MnS. In addition, Mn is also effective for increasing hardness by increasing hardenability. In order to realize such effects, it is necessary that the Mn content be 0.2% or more. However, in the case where the Mn content is more than 2.0%, embrittlement of a material occurs as a result of segregation at the solidification interface. Therefore, the Mn content is limited to 0.2% or more and 2.0% or less, preferably 0.3% or more and 1.0% or less.

Cr: 0.8% or More and 2.1% or Less

Since Cr is a chemical element which increases the amount and hardness of eutectic carbides, Cr is effective for increasing wear resistance by suppressing carbides breaking when rolling is performed. In order to realize such an effect, it is necessary that the Cr content be 0.8% or more. On the other hand, in the case where the Cr content is more than 2.1%, there is a decrease in surface deterioration resistance due to an increase in the amount of eutectic carbides and there is a decrease in heat shock resistance due to a decrease in the amount of graphite. Therefore, the Cr content is limited to 0.8% or more and 2.1% or less, preferably 1.2% or more and 2.0% or less.

Mo: 0.3% or More and 1.1% or Less

Since Mo is effective for increasing the strength of carbides and a matrix without excessively increasing the amount of eutectic carbides, Mo is effective for increasing wear resistance while maintaining excellent surface deterioration resistance. In particular, by adding Mo in combination with Nb and thereby increasing the strength of hard MC type carbides, the important effect of significantly increasing wear resistance is realized. In order to realize such effects, it is necessary that the Mo content be 0.3% or more. On the other hand, in the case where the Mo content is more than 1.1%, since eutectic carbides become hard and brittle, there is a decrease in heat shock resistance and surface deterioration resistance. In order to achieve excellent heat shock resistance and surface deterioration resistance according to embodiments of the present disclosure, the Mo content is limited to 0.3% or more and 1.1% or less, preferably 0.4% or more and 1.0% or less.

Ni: 3.0% or More and 7.0% or Less

Since Ni is effective for increasing hardenability, Ni is added in order to achieve Shore hardness (Hs of 76 to 88) which is required for a rolling mill roll by forming a matrix structure of a hard martensite or bainite phase. Such an effect is realized in the case where the Ni content is 3.0% or more. However, in the case where the Ni content is more than 7.0%, since there is an increase in the amount of a soft retained austenite phase in the matrix structure due to an austenite phase becoming significantly stable, the required hardness cannot be achieved and there is a decrease in wear resistance. Therefore, the Ni content is limited to 3.0% or more and 7.0% or less, preferably 3.0% or more and 5.0% or less.

V: 1.2% or More and 2.2% or Less

V is a chemical element which is effective for increasing wear resistance by forming hard MC type carbides. In certain embodiments, it is necessary that the V content be 1.2% or more in order to achieve wear resistance above a certain level. On the other hand, in the case where the V content is more than 2.2%, since hard MC type carbides take on a convex shape on the rolling surface, roll surface deterioration occurs, and in addition, negative effects such as a decrease in heat shock resistance occur. Therefore, the V content is limited to 1.2% or more and 2.2% or less, preferably 1.4% or more and 2.1% or less.

Nb: 0.1% or More and 0.8% or Less

Nb is a chemical element which is effective for increasing the strength of carbides by forming a solid solution in MC type carbides. In particular, by adding Nb in combination with specified amounts of Cr, Mo, and V, Nb has an important effect of significantly increasing wear resistance by significantly increasing the strength of carbides. In addition, in the case where only V is added, MC type carbides take on a feathery appearance and there is an increase in the grain diameter of a microstructure, thereby inducing roll surface deterioration. However, by adding a combination of Nb and V, it is possible to suppress MC type carbides taking on a feathery shape. Moreover, by adding a combination of Al, REM, and/or Ti, carbides finely disperse, and therefore surface deterioration can be suppressed. In order to realize such effects, it is necessary that the Nb content be 0.1% or more. On the other hand, in the case where the Nb content is more than 0.8%, since MC carbides take on a dendritic shape, and since there is an increase in grain diameter, surface deterioration conversely tends to occur. In addition, in the case where a roll is manufactured by performing centrifugal casting, segregation of MC type carbides occurs. Therefore, the Nb content is limited to 0.1% or more and 0.8% or less, preferably 0.2% or more and 0.6% or less.

REM: 0.0005% or More and 0.1% or Less

REM is a very important chemical element which is effective for increasing heat shock resistance, surface deterioration resistance, and wear resistance in the case where REM is added in combination with Al in an amount within a specified range. REM single substance is effective for increasing wear resistance by ensuring that the shape of graphite is spherical. In addition, since the specific weight of REM is 6 to 8 and is nearly equal to that of Fe, REM also has the advantage of being less likely to cause gravity segregation. In order to realize such effects of REM, it is necessary that the REM content be 0.0005% or more. On the other hand, in the case where the REM content is more than 0.1%, the effects described above disappear, and in addition, there is a decrease in heat shock resistance and surface deterioration resistance as a result of suppressing the crystallization of graphite. Therefore, the REM content is limited to 0.0005% or more and 0.1% or less, preferably 0.001% or more and 0.06% or less. Here, "REM"in embodiments refers to a rare-earth element or a rare-earth metal (expressed by atomic symbols Sc, Y, La, Ce, Pr, Nd, Pm, Sm, Eu, Gd, Tb, Dy, Ho, Er, Tm, Yb, and Lu), and a misch metal, that is, a mixture of two or more of these chemical elements (containing mainly Ce and La) is added in certain embodiments. Since it is difficult or very expensive to extract each of the rare-earth metals described above, the REM content was defined as twice the Ce content by analyzing only Ce.

Al: 0.003% or More and 0.05% or Less

Al is a very important chemical element which is effective for increasing heat shock resistance, surface deterioration resistance, and wear resistance in the case where Al is added in combination with REM in an amount in a certain range. Al single substance is effective for increasing heat shock resistance by ensuring that the shape of graphite is thin, long, and flaky. In order to realize such effects of Al, it is necessary that the Al content be 0.003% or more. On the other hand, in the case where the Al content is more than 0.05%, there is a serious negative effect in that there is a decrease in heat shock resistance, wear resistance, and surface deterioration resistance due to an increase in the grain diameter of graphite, and in addition, blowholes and micro porosities occur due to a decrease in casting performance. Therefore, the Al content is limited to 0.003% or more and 0.05% or less, preferably 0.005% or more and 0.050% or less.

B: 0.001% or More and 0.05% or Less

B is effective for finely dispersing graphite, and in particular, is effective for increasing heat shock resistance in the case where the B content is 0.001% or more provided that REM and Al are added in combination. On the other hand, in the case where the B content is more than 0.05%, there is a significant decrease in heat shock resistance and wear resistance. Therefore, the B content is limited to 0.001% or more and 0.05% or less, preferably 0.001% or more and 0.04% or less.

One or Two Selected from Ti: 0.03% or Less and Ca: 0.04% or Less

Ti and Ca are both effective for increasing surface deterioration resistance by growing MC type carbides in a spherical shape. The effect described above is realized in the case where the Ti content is 0.03% or less and the Ca content is 0.04% or less. On the other hand, in the case where the Ti content is more than 0.03%, there is a decrease in heat shock resistance and surface deterioration resistance due to a change in the shape of graphite, and in addition, the segregation of MC type carbides is promoted when the surface layer of a roll is manufactured using a centrifugal casting method. In addition, in the case where the Ca content is more than 0.04%, there is a decrease in heat shock resistance, and in addition, the segregation of graphite and MC type carbides is promoted when the surface layer of a roll is manufactured using a centrifugal casting method. It is preferable that the Ti content be 0.001% or more and 0.01% or less and that the Ca content be 0.0002% or more and 0.03% or less.

One or Two Selected from Co: 2% or Less and W: 2% or Less

Co is effective for increasing the strength of a matrix by forming a solid solution in the matrix metal. However, since the effect becomes saturated in the case where the Co content is more than 2%, the Co content is limited to 2% or less. In addition, since W is effective for increasing wear resistance by increasing the amount of carbides, it is preferable that a small amount of W be added. However, since there is a decrease in heat shock resistance and surface deterioration resistance in the case where the W content is more than 2%, the W content is limited to 2% or less. It is preferable that the Co content be 0.1% or more and 1.5% or less and that the W content be 0.1% or more and 1.5% or less.

In embodiments, in addition to controlling a chemical composition to be within the ranges described above, it is important to control the contents of the constituent chemical elements so as to satisfy the following relational expressions (1) and (2):

$$Cr+0.2 \leq C-(0.24 \times V+0.13 \times Nb) \leq 3.0 \quad (1),$$

$$0.01 \leq REM/Al \leq 3.2 \quad (2),$$

(where C, V, Nb, Cr, REM, and Al respectively represent the contents (mass %) of corresponding chemical elements). With this, the surface layer (material) of a hot rolling mill roll having excellent wear resistance, heat shock resistance, and surface deterioration resistance at the same time can be obtained.

$$Cr+0.2 \leq C-(0.24 \times V+0.13 \times Nb) \leq 3.0 \quad (1)$$

In the case where the effective C content is less than Cr+0.2, there is a decrease in heat shock resistance and surface deterioration resistance due to the crystallization of graphite being suppressed. On the other hand, in the case where the effective C content is more than 3.0%, there is a decrease in heat shock resistance and surface deterioration resistance due to an excessive increase in the amounts of eutectic carbides and graphite.

$$0.01 \leq REM/Al \leq 3.2 \quad (2)$$

In the case where REM or Al alone is added, there is a negative effect in that there is a decrease in heat shock resistance or a decrease in wear resistance. However, in the case where REM and Al are added in combination with each other, both have effects of neutralizing each other's negative effects. Therefore, it is necessary that REM and Al be added in combination with each other. In the case where REM/Al is less than 0.01, there is a decrease in surface deterioration resistance and wear resistance. In the case where REM/Al is more than 3.2, there is a decrease in heat shock resistance and surface deterioration resistance. In the case of the chemical composition according to certain embodiments, by controlling the contents of REM and Al so as to satisfy the relationship $0.01 \leq REM/Al \leq 3.2$, a roll material having excellent heat shock resistance, surface deterioration resistance, and wear resistance at the same time can be obtained. It is preferable that REM/Al be 0.05 or more and 3.0 or less.

There is no particular limitation on what method is used for manufacturing the surface layer material of a roll. However, it is preferable that molten steel having the chemical composition described above be made into the surface layer material of a roll having specified dimensions using a centrifugal casting method from the viewpoint of manufacturing cost. In this case, it is preferable that a composite roll is formed by stopping the rotation of a casting mold in the middle of the solidification of the surface layer material of the roll or after the solidification has been completed and by casting the inner layer material of the roll using a static casting method. With this method, the inner surface of the surface layer material of the roll is remelted so that a composite roll consisting of a surface layer and an inner layer which are welded and integrated can be obtained.

It is preferable that the inner layer which is cast using a static casting method be composed of, for example, spheroidal graphite cast iron, vermicular graphite cast iron, or graphite steel, which is excellent in terms of casting performance and mechanical properties. In addition, an intermediate layer composed of graphite steel or high-carbon steel may be formed between a surface layer and an inner layer. In the case where a roll Is manufactured using a centrifugal casting method, it is appropriate that an Intermediate layer be cast using a centrifugal method following the centrifugal casting of a surface layer.

The explanation above is intended mainly for a hot rolling mill roll for a steel sheet. However, the present disclosure is not limited to a hot rolling mill composite roll for a steel sheet, and it is needless to say that there is no problem in the case where the present disclosure is applied to a rolling mill composite grooved roll for a steel pipe. In the case where a rolling mill sleeve roll for a steel pipe is manufactured, it is appropriate that an inner layer material composed of spheroidal graphite cast iron or high-carbon steel be cast using a centrifugal casting method following the centrifugal casting of a surface layer.

EXAMPLES

By smelting the molten steels having the chemical compositions given in Table 1, by inoculating Si in an amount of 0.15% using Ca—Si as an inoculum, and then by performing centrifugal casting, ring-shaped test pieces (having an outer diameter of 250 mmϕ and a thickness of 80 mm) were cast. Here, the casting temperature was 1450° C., and the centrifugal force was 160G in multiples of gravity. After casting had been performed, a tempering treatment was performed on the test pieces at a temperature of 400° C. to 480° C. The hardness after a tempering treatment had been performed was Hs of 77 to 83. A known nickel grain cast iron was used as a conventional example, and the hardness of the conventional example was controlled to be Hs of 78 to 80 by performing a tempering treatment at a temperature of 430° C.

Using test pieces taken from each of these ring-shaped test pieces, microstructure observation, a wear test, and a heat shock test were carried out.

(1) Microstructure Observation

Using a test piece for microstructure observation taken from the ring-shaped test piece, a graphite structure was observed after mirror polishing had been performed, and a carbide structure was observed after etching had been performed using a nitric acid alcohol solution. First, by observing whether or not there was graphite using an optical microscope at a magnification of 100 times, the segregation states in a graphite structure and a carbide structure were investigated by performing a visual check. A case where an apparent quantitative change or a form change was recognized in more than about 30% of the structure by performing a visual check was evaluated as segregation "observed", and a case where segregation was not identified was evaluated as segregation "none".

(2) Wear Test

Figure 2:
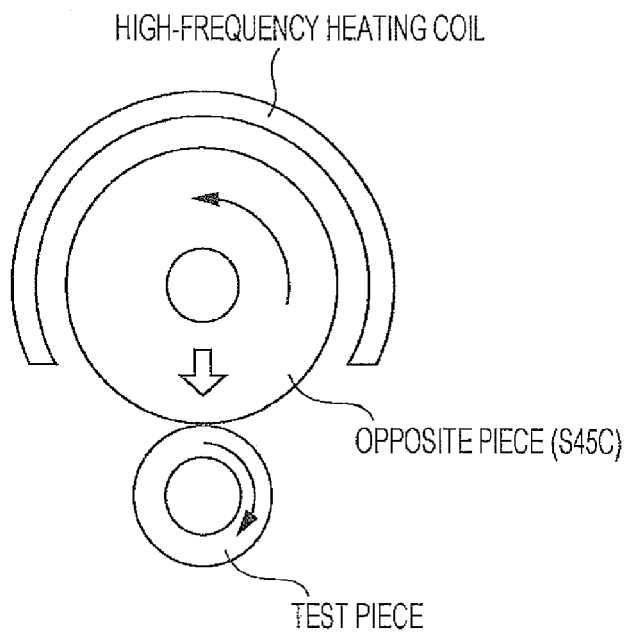
FIG. 2 is a schematic diagram illustrating the outline of a wear test.

Using a test piece (having a diameter of 60 mmϕ) and a thickness of 10 mm) taken from the ring-shaped test piece and an opposite material (composed of S45C and having a diameter of 190 mmϕ) and a thickness of 20 mm), a wear test was performed using a 2 disk sliding abrasion method (FIG. 2). While the test piece was rotated at a rotational speed of 720 rpm and the opposite material was heated at a temperature of 830° C., the test piece was cooled with water so that the surface temperature of the test piece was 440° C. by controlling the amount of the cooling water. The test piece and the opposite material were pressed to each other and rotated for a duration of 160 minutes under conditions that the sliding ratio between them was 8% and the loading force was 100 kgf (980 N). In this test, the opposite material was replaced every 40 minutes. After the test had been performed, a decrease in weight of each test piece due to wear (wear weight loss) was determined. The wear resistance of each test piece was evaluated on the basis of the ratio of the wear weight loss of the test piece to that of the conventional example, which indicated their comparative merits and demerits.

Moreover, the surface deterioration state was observed by performing a visual check, a case where irregularity is significant (corresponding to a roughness of about 15 to 20 μm $Rz_{JIS}$ or more ($Rz_{JIS}$: ten-point average roughness)) was evaluated as surface deterioration "observed", and a case other than that was evaluated as surface deterioration "none". Here $Rz_{JIS}$ and Ra are values in accordance with JIS B 0601-2001.

(3) Heat Shock Test

Figure 3:
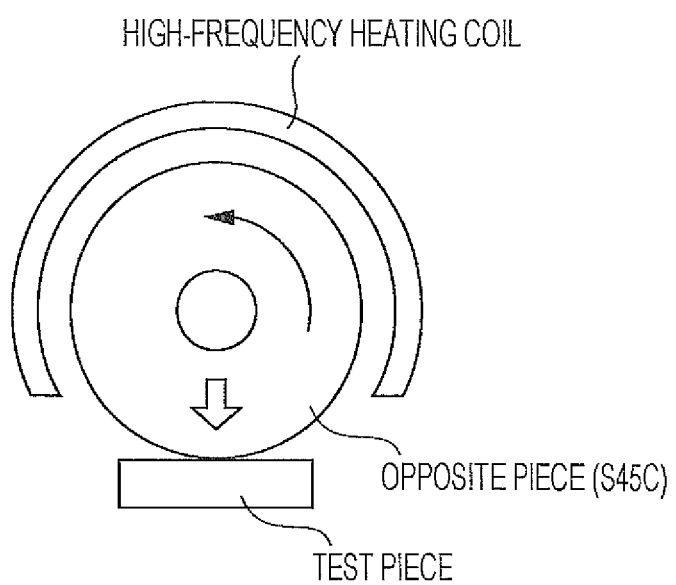
FIG. 3 is a schematic diagram illustrating the outline of a heat shock test.

Using a plate-shaped test piece having a thickness of 25 mm taken from the ring-shaped test piece and a disk-shaped opposite material (composed of S45C and having a diameter of 190 mmϕ), a heat shock test was performed using the testing machine configured as illustrated in FIG. 3.

The plate-shaped test piece having a thickness of 25 mm was rapidly heated by pressing the disc-shaped opposite material (composed of S45C and having a diameter of 190 mmϕ) which was rotating at 150 rpm while being heated at 830° C. using a high-frequency heating coil to the plate-shaped test piece with a load of 100 kgf for a duration of 10 seconds, and then the plate-shaped test piece was cooled with water at the same time as unloading in order to apply heat shock to the test piece. After the test had been performed, by performing a penetrant inspection, by cutting the test piece at the three portions having a large amount of stains of a developing liquid, and by observing the cross sections in order to determining the maximum depth of the cracks, the maximum depth was defined as a crack depth, and heat shock resistance was evaluated by comparison to NiG, which was the conventional example.

The obtained results are given in Table 2.

The examples of the present disclosure were all excellent in terms of wear resistance, had a small crack depth indicating excellent heat shock resistance, and had no segregation or surface deterioration, which means these examples had excellent properties for a rolling mill roll.

On the other hand, the comparative examples, which were out of the range according to the embodiments of the present disclosure, were significantly poor in terms of one or more of wear resistance, heat shock resistance, and surface deterioration resistance.

TABLE 1

| No | C | Si | Mn | Ni | Cr | Mo | V | Nb | REM | Al | B | Ti |
|---|---|---|---|---|---|---|---|---|---|---|---|---|
| 1 | 3.0 | 1.8 | 0.9 | 3.6 | 1.7 | 1.0 | 1.9 | 0.2 | 0.009 | 0.022 | 0.019 | — |

TABLE 1-continued

| No | C | Si | Mn | Cr | Mo | | Ni | V | Nb | P | S | REM | Al |
|---|---|---|---|---|---|---|---|---|---|---|---|---|---|
| 2 | 3.1 | 1.7 | 0.8 | 4.1 | 2.0 | 0.7 | 2.1 | 0.7 | 0.018 | 0.019 | 0.024 | — | |
| 3 | 3.3 | 1.9 | 0.4 | 4.4 | 1.8 | 0.8 | 1.8 | 0.3 | 0.021 | 0.022 | 0.031 | — | |
| 4 | 3.0 | 1.6 | 0.3 | 4.5 | 2.1 | 1.1 | 1.6 | 0.2 | 0.001 | 0.049 | 0.003 | 0.001 | |
| 5 | 3.2 | 1.7 | 1.0 | 4.2 | 1.9 | 0.4 | 1.9 | 0.3 | 0.048 | 0.016 | — | — | |
| 6 | 3.2 | 1.4 | 0.7 | 4.0 | 1.9 | 0.9 | 1.8 | 0.5 | 0.008 | 0.05 | 0.004 | — | |
| 7 | 2.7 | 2.2 | 0.5 | 4.5 | 1.1 | 0.4 | 1.7 | 0.4 | 0.016 | 0.018 | — | 0.01 | |
| 8 | 3.4 | 1.5 | 0.8 | 3.9 | 1.8 | 1.0 | 2.0 | 0.3 | 0.007 | 0.024 | 0.043 | — | |
| 9 | 3.0 | 1.8 | 0.8 | 4.5 | 0.8 | 0.8 | 2.2 | 0.6 | 0.022 | 0.027 | — | — | |
| 10 | <u>3.7</u> | 1.9 | 0.6 | 4.4 | <u>1.7</u> | 0.6 | 2.1 | 0.2 | 0.019 | 0.024 | — | — | |
| 11 | 3.3 | 1.5 | 0.7 | 4.5 | 1.9 | 0.9 | 1.9 | 0.3 | 0.053 | <u>0.0007</u> | — | — | |
| 12 | 3.4 | 1.7 | 0.6 | 4.6 | 1.8 | 1.0 | 1.9 | 0.3 | <u>0.0001</u> | 0.052 | — | — | |
| 13 | 3.3 | 2.0 | 0.4 | 4.7 | 1.8 | 0.9 | 1.9 | 0.3 | 0.018 | <u>0.083</u> | — | — | |
| 14 | 3.3 | 1.6 | 0.5 | 4.5 | <u>1.4</u> | 2.0 | 2.0 | 0.4 | 0.018 | <u>0.074</u> | 0.042 | — | |
| 15 | 3.4 | 1.5 | 0.8 | 4.5 | <u>2.3</u> | 1.0 | 2.0 | 0.3 | 0.045 | 0.012 | <u>0.071</u> | — | |
| 16 | 3.4 | 1.6 | 0.4 | 4.6 | 2.0 | 0.3 | <u>2.8</u> | 0.4 | 0.007 | 0.019 | 0.042 | — | |
| 17 | 3.2 | 1.7 | 0.4 | 3.9 | 1.4 | 0.4 | 1.4 | 0.3 | 0.015 | 0.018 | 0.022 | — | |
| 18 | 3.3 | 1.7 | 0.9 | 4.6 | 1.8 | 0.5 | 1.8 | 0.3 | 0.006 | 0.021 | — | — | |
| NiG | 3.6 | 0.8 | 0.8 | 4.6 | — | 0.3 | — | — | — | — | — | — | |

| No | Ca | Co | W | Cr + 0.2 | C—0.24V—0.13Nb | REM/Al | |
|---|---|---|---|---|---|---|---|
| 1 | — | — | — | 1.9 | 2.5 | 0.4 | Example |
| 2 | 0.0016 | — | — | 2.2 | 2.5 | 0.9 | Example |
| 3 | — | — | — | 2.0 | 2.8 | 1.0 | Example |
| 4 | 0.0006 | 0.1 | 0.1 | 2.3 | 2.6 | 0.02 | Example |
| 5 | — | — | — | 2.1 | 2.7 | 3.0 | Example |
| 6 | — | — | — | 2.1 | 2.7 | 0.16 | Example |
| 7 | — | — | — | 1.3 | 2.2 | 0.9 | Example |
| 8 | — | — | — | 2.0 | 2.9 | 0.3 | Example |
| 9 | 0.0019 | — | — | 2.7 | 2.4 | 0.8 | Comparative Example |
| 10 | 0.0012 | — | — | 1.9 | 3.2 | 0.8 | Comparative Example |
| 11 | — | — | — | 2.1 | 2.8 | <u>75.7</u> | Comparative Example |
| 12 | — | — | — | 2.0 | 2.9 | <u>0.002</u> | Comparative Example |
| 13 | — | — | — | 2.0 | 2.8 | 0.2 | Comparative Example |
| 14 | 0.0007 | 0.01 | — | 2.2 | 2.8 | 0.2 | Comparative Example |
| 15 | — | — | — | 2.5 | 2.9 | 3.8 | Comparative Example |
| 16 | — | — | — | 2.2 | 2.7 | 0.4 | Comparative Example |
| 17 | 0.0018 | — | 1.1 | 1.6 | 2.8 | 0.8 | Example |
| 18 | — | 1.2 | — | 2.1 | 2.8 | 0.3 | Example |
| NiG | — | — | — | 2.0 | — | — | Conventional Example |

Underline indicates a value out of the range according to the present invention.

TABLE 2

| No | Segregation | Wear Ratio | Surface Deterioration | Heat Shock Crack Depth, mm | |
|---|---|---|---|---|---|
| 1 | none | 0.5 | none | 1.8 | Example |
| 2 | none | 0.4 | none | 1.9 | Example |
| 3 | none | 0.6 | none | 1.7 | Example |
| 4 | none | 0.6 | none | 2.2 | Example |
| 5 | none | 0.6 | none | 2.0 | Example |
| 6 | none | 0.5 | none | 1.7 | Example |
| 7 | none | 0.6 | none | 1.3 | Example |
| 8 | none | 0.5 | none | 1.8 | Example |
| 9 | observed | 0.7 | observed | 3.6 | Comparative Example |
| 10 | observed | 0.9 | observed | 3.8 | Comparative Example |
| 11 | observed | 0.7 | observed | 4.8 | Comparative Example |
| 12 | observed | 1.2 | observed | 3.8 | Comparative Example |
| 13 | observed | 0.9 | observed | 3.4 | Comparative Example |
| 14 | observed | 0.7 | observed | 3.6 | Comparative Example |
| 15 | observed | 0.8 | observed | 3.5 | Comparative Example |
| 16 | observed | 0.7 | observed | 3.8 | Comparative Example |
| 17 | none | 0.6 | none | 2.2 | Example |
| 18 | none | 0.6 | none | 1.7 | Example |
| NiG | none | 1.0 | none | 2.1 | Conventional Example |

The invention claimed is:

1. A surface layer material of a hot rolling mill roll which is adapted to be used for a surface layer of a hot rolling mill composite roll, the material having a chemical composition containing, by mass%, C: 2.4% or more and 3.5% or less, Si: 1.2% or more and 2.4% or less, Mn: 0.2% or more and 2.0% or less, Cr: 0.8% or more and 2.1% or less, Mo: 0.3% or more and 1.1% or less, Ni: 3.0% or more and 7.0% or less, V: 1.2% or more and 2.2% or less, Nb: 0.1% or more and 0.8% or less, REM: 0.0005% or more and 0.1% or less, Al: 0.003% or more and 0.05% or less, and the balance being Fe and inevitable impurities, wherein the contents of C, Cr, V, Nb, REM, and Al satisfy relational expressions (1) and (2) below:

$$Cr+0.2 \leq C-(0.24 \times V+0.13 \times Nb) \leq 3.0 \quad (1)$$

$$0.01 \leq REM/Al \leq 3.2 \quad (2),$$

where C, Cr, V, Nb, REM, and Al respectively represent the mass% contents of the corresponding chemical elements.

2. The surface layer material of the hot rolling mill roll according to claim 1, wherein the chemical composition of the material further contains, by mass %, B: 0.001% or more and 0.05% or less.

3. The surface layer material of the hot rolling mill roll according to claim 1, wherein the chemical composition of the material further contains, by mass % at least one of the following element: Ca: 0.04% or less and Ti: 0.03% or less.

4. The surface layer material of the hot rolling mill roll according to claim 1, wherein the chemical composition of the material further contains, by mass %, at least one of the following elements: Co: 2.0% or less and W: 2.0% or less.

5. A hot rolling mill composite roll comprising:
an inner layer, and
a surface layer welded and, integrated with the inner layer,
the surface layer having a chemical composition containing, by mass%, C: 2.4% or more and 3.5% or less, Si: 1.2% or more and 2.4% or less, Mn: 0.2% or more and 2.0% or less, Cr: 0.8% or more and 2.1% or less, Mo: 0.3% or more and 1.1% or less, Ni: 3.0% or more and 7.0% or less, V: 1.2% or more and 2.2% or less, Nb: 0.1% or more and 0.8% or less, REM: 0.0005% or more and 0.1% or less, Al: 0.003% or more and 0.05% or less, and the balance being Fe and inevitable impurities,
wherein the contents of C, Cr, V, Nb, REM, and Al satisfy relational expressions (1) and (2) below:

$$Cr+0.2 \leq C-(0.24 \times V+0.13 \times Nb) \leq 3.0 \quad (1)$$

$$0.01 \leq REM/Al \leq 3.2 \quad (2),$$

where C, Cr, V, Nb, REM, and Al respectively represent the mass% contents of corresponding chemical elements.

6. The hot rolling mill composite roll according to claim 5, wherein the chemical composition of the surface layer further contains, by mass %, B: 0.001% or more and 0.05% or less.

7. The hot rolling mill composite roll according to claim 5, wherein the chemical composition of the surface layer further contains, by mass %, at least one of the following elements: Ca: 0.04% or less and Ti: 0.03% or less.

8. The hot rolling mill composite roll according to claim 5, wherein the chemical composition of the surface layer further contains, by mass %, at least one of following elements: Co: 2.0% or less and W: 2.0% or less.

9. The surface layer material of the hot rolling mill roll according to claim 2, wherein the chemical composition of the material further contains, by mass%, at least one of the following elements: Ca: 0.04% or less and Ti: 0.03% or less.

10. The surface layer material of the hot rolling mill roll according to claim 2, wherein the chemical composition of the material further contains, by mass%, at least one of the following elements: Co: 2.0% or less and W: 2.0% or less.

11. The surface layer material of the hot rolling mill roll according to claim 3, wherein the chemical composition of the material further contains, by mass%, at least one of the following elements: Co: 2.0% or less and W: 2.0% or less.

12. The surface layer material of the hot rolling mill roll according to claim 9, wherein the chemical composition of the material further contains, by mass%, at least one of the following elements: Co: 2.0% or less and W: 2.0% or less.

13. The hot rolling mill composite roll according to claim 6, wherein the chemical composition of the surface layer further contains, by mass%, at least one of the following elements: Ca: 0.04% or less and Ti: 0.03% or less.

14. The hot rolling mill composite roll according to claim 6, wherein the chemical composition of the surface layer further contains, by mass%, at least one of the following elements: Co: 2.0% or less and W: 2.0% or less.

15. The hot rolling mill composite roll according to claim 7, wherein the chemical composition of the surface layer further contains, by mass%, at least one of the following elements: Co: 2.0% or less and W: 2.0% or less.

16. The hot rolling mill composite roll according to claim 13, wherein the chemical composition of the surface layer further contains, by mass%, at least one of the following elements: Co: 2.0% or less and W: 2.0% or less.

* * * * *